US006202817B1

(12) United States Patent
Link et al.

(10) Patent No.: US 6,202,817 B1
(45) Date of Patent: Mar. 20, 2001

(54) THRUST PLATE ASSEMBLY WITH MEANS FOR SECURING AGAINST DISPLACEMENT

(75) Inventors: Achim Link, Schweinfurt; Wolfgang Reiber, Sennfeld; Wolfgang Knauer, Königsberg; Peter Eichelsbacher, Dittelbrunn, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/368,375

(22) Filed: Aug. 4, 1999

(30) Foreign Application Priority Data

Aug. 4, 1998 (DE) ............................................. 198 35 201

(51) Int. Cl.⁷ ..................................................... F16D 13/75
(52) U.S. Cl. ..................................... 192/70.25; 192/111 A
(58) Field of Search ............................. 192/70.25, 111 A

(56) References Cited

U.S. PATENT DOCUMENTS

| 5,634,541 | * | 6/1997 | Maucher | 192/70.25 |
| 5,690,203 | * | 11/1997 | Link et al. | 192/70.25 |
| 5,803,223 | * | 9/1998 | Thirion De Briel et al. | 192/70.25 |
| 5,934,429 | * | 8/1999 | Jennings | 192/70.25 |
| 5,988,338 | * | 11/1999 | Maucher | 192/70.25 |

FOREIGN PATENT DOCUMENTS

| 44 36 111 | 1/1996 | (DE) | F16D/13/75 |
| 195 06 698 | 3/1997 | (DE) | F16D/13/75 |
| 198 16 519 | 4/1998 | (DE) | . |
| 196 49 135 | 6/1998 | (DE) | F16D/13/75 |

* cited by examiner

Primary Examiner—Richard M. Lorence
(74) Attorney, Agent, or Firm—Cohen, Pontani, Lieberman & Pavane

(57) ABSTRACT

A thrust plate assembly for a motor vehicle friction clutch with automatic wear compensation includes a housing fastened to a flywheel for common rotation about an axis of rotation. An axially displaceable pressure plate is connected with the housing so as to be substantially fixed with respect to rotation relative to it and has a friction face on a side facing the flywheel. An axially acting spring device presses the pressure plate toward the flywheel via an axially acting adjusting mechanism and accordingly can clamp a driven part arranged between the pressure plate and the flywheel. At least one play sensor is guided in the thrust plate assembly so as to be substantially axially displaceable against friction. A wear detection portion of the play sensor is axially displaceable in the thrust plate assembly in response to wear and an actuation portion of the play sensor cooperates with the adjusting mechanism for allowing an axial lengthening of the adjusting mechanism in response to wear. The thrust assembly also includes at least one device for securing the adjusting mechanism against rotation.

17 Claims, 5 Drawing Sheets

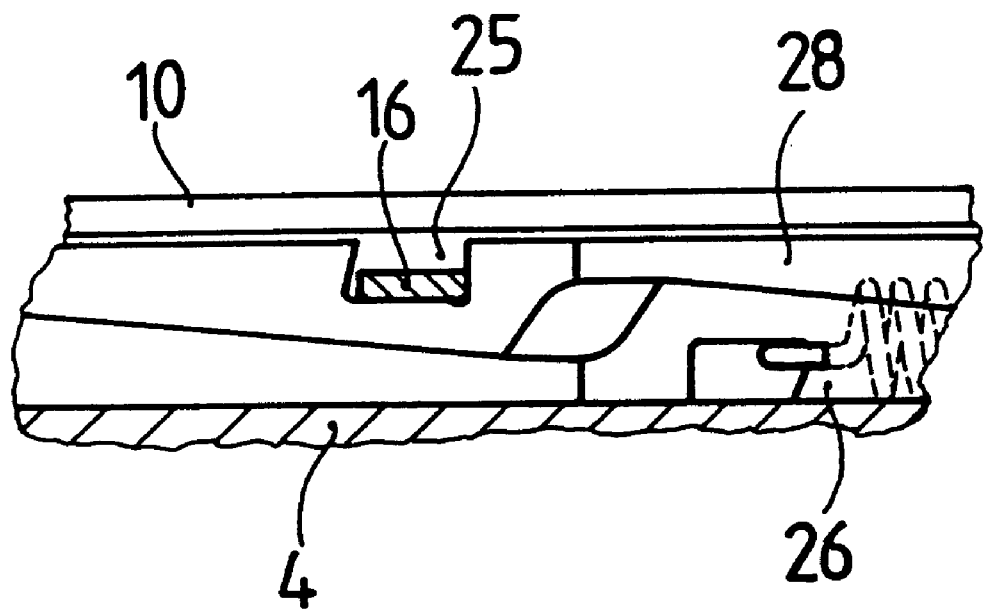

THRUST PLATE ASSEMBLY WITH MEANS FOR SECURING AGAINST DISPLACEMENT

BACKGROUND OF THE INVENTION

1. Field of the Invention

The present invention is directed to a thrust plate assembly with automatic wear adjustment and a device for securing the automatic wear adjustment against rotation.

2. Description of the Related Art

A prior art friction clutch is disclosed in DE-PS 195 06 698 C2 includes an adjusting device comprising two adjusting rings arranged between an outer diameter area of a diaphragm spring and a pressure plate. A play sensor is located in an axial bore hole in the pressure plate, where it is held by a frictional clamping fit. An actuator portion is connected to the play sensor and has radial inner end located between the outer diameter area of a diaphragm spring and the pressure plate, as viewed in the axial direction, and extends up to a cutout in one of the two adjusting rings. A spring which loads the two adjusting rings in the circumferential direction and axially lengthens the adjusting device additionally reinforces the clamping fit of the play sensor. As wear occurs in the friction linings during operation, this frictional clamping is canceled as a result of the loading by the diaphragm spring, so that an axial distance corresponding to the wear at the friction faces is adjusted between the radial inner end of the actuation portion and the adjusting ring in the region of the cutout. During the next clutch release process, the adjusting device is sufficiently lengthened so that this distance of wear is eliminated. While rotation of the adjusting ring is substantially prevented by the play sensor which reaches into the cutout, torsional vibrations may nevertheless be transmitted to this adjusting ring. It is especially possible for vibrations to transmitted to the adjusting ring when the adjusting ring on the diaphragm spring side is rotated to the extent that one of the walls of the cutout encounters the actuation device of the play sensor. Due to the rotation, but also because of vibrations and torsional vibrations, the clamping of the play sensor in the pressure plate may loosen, so that information about wear for the wear adjusting device may be lost. Particularly in case of strong torsional vibrations, the adjusting ring on the flywheel side may rotate relative to the adjusting ring on the diaphragm spring side, resulting in an arbitrary adjustment of the wear adjustment means.

A prior art thrust plate assembly shown in DE-PS 198 16 519.6-12 has a device which merely prevents reversal of the automatic play compensation adjustment. Accordingly, this prior art cannot prevent the above-mentioned arbitrary adjustment of the wear adjusting means.

SUMMARY OF THE INVENTION

It is the object of the present invention to improve the thrust plate assemblies of the prior art with respect to reliability of adjustment. This object is met, according to the invention, by a thrust plate assembly for a motor vehicle friction clutch with automatic wear compensation, comprising a flywheel rotatably mounted for rotation about an axis of rotation, a housing fastened to said flywheel for rotation with said flywheel about said axis of rotation, a pressure plate connected to said housing so that said pressure plate is rotatably fixed to said housing and axially movable with respect to said housing, and said pressure plate having a friction face on a side of said pressure plate facing said flywheel, a diaphragm spring arranged between said housing and said pressure plate for urging said pressure plate toward said flywheel, an axially acting adjusting mechanism arranged between said axially acting spring element and said pressure plate such that said axially acting spring element acts on said pressure plate via said axially acting adjusting mechanism, said axially acting adjusting mechanism having an adjustable axial length for compensating wear of the friction clutch, a play sensor having a wear detection portion axially displaceably arranged for axial displacement against friction relative to said pressure plate in response to the wear of the friction clutch and an actuator portion connected to said wear detection portion and operatively arranged relative to said adjusting mechanism for allowing an axial lengthening of said axially acting adjusting mechanism in response to the wear, and a device for securing at least a portion of said axially acting adjusting mechanism against rotation.

The separate securing device for the adjusting mechanism ensures that the play sensor regulating the axial extension of the adjusting mechanism will not be acted upon or displaced conversely by the adjusting mechanism. Accordingly, the play sensor dependably regulates the length of the adjusting mechanism to the correct predetermined degree. The risk of direct unwanted adjustment of the adjusting mechanism may also be reduced.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 3 is a sectional view along line III—III in FIG. 2a;

DETAILED DESCRIPTION OF THE PRESENTLY PREFERRED EMBODIMENTS

FIGS. 1 and 3 through 6 each show only a portion of embodiments of a thrust plate assembly according to the present invention. The housing, spring element and disk flywheel of the thrust plate assembly are omitted from these figures for the sake of clarity.

Figure 1:
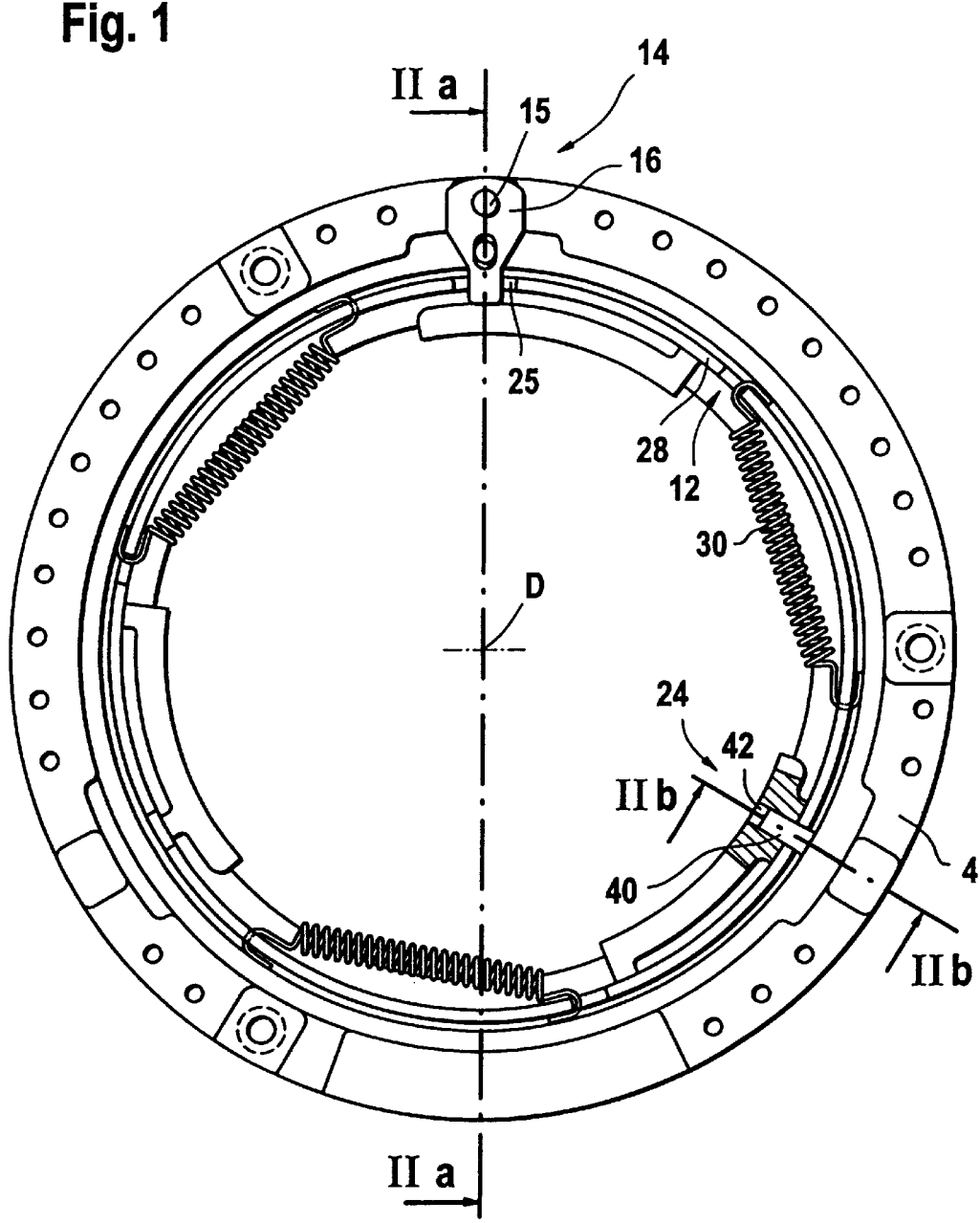
FIG. 1 is a partial sectional top view showing a portion of the thrust plate assembly in which the adjusting ring on the diaphragm spring side is fixed to the pressure plate by a sheet-metal yoke or clip.
Figure 2A:
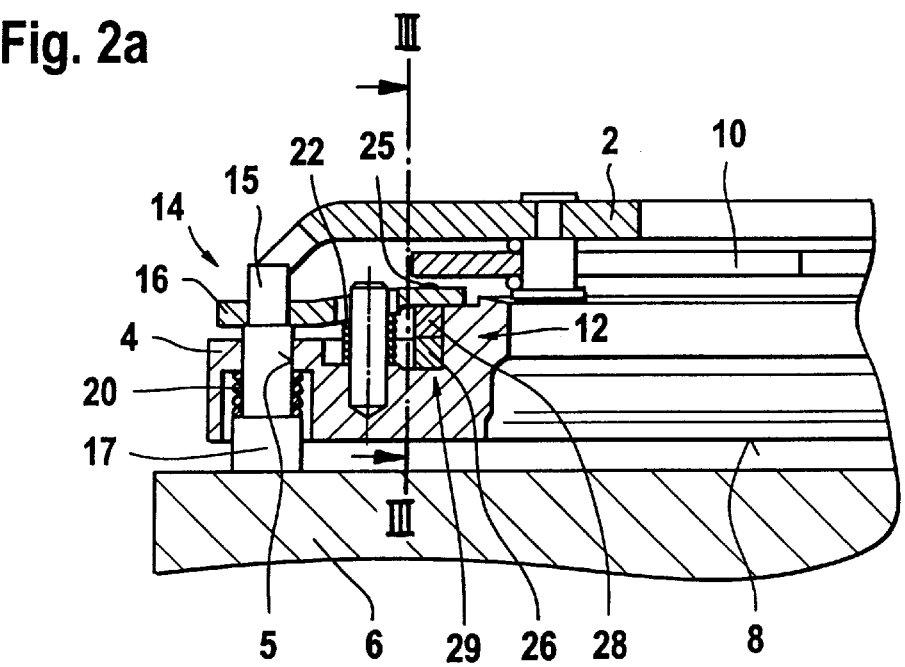
FIG. 2a shows a longitudinal section of the thrust plate assembly along line IIa—IIa in FIG. 1, including a schematic view of the housing, spring element and disk flywheel.
Figure 2B:
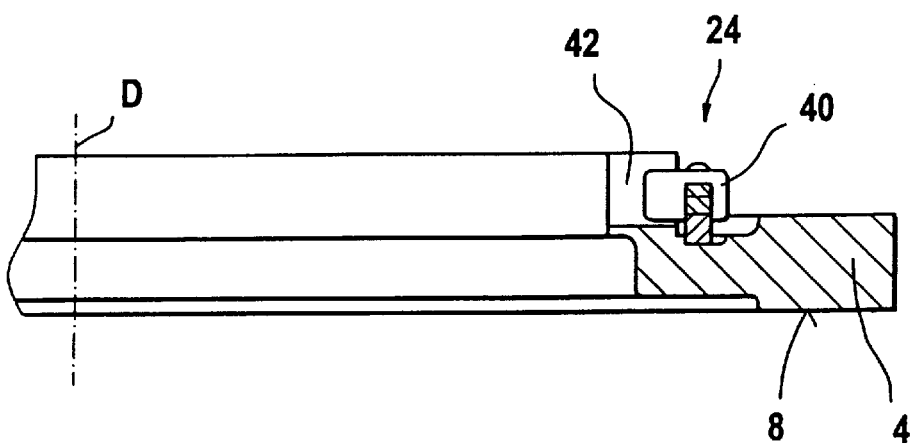
FIG. 2b shows a longitudinal section of the thrust plate assembly along line IIb—IIb

The thrust plate assembly according to an embodiment of the present invention is shown in FIGS. 1 and 2 and comprises a housing 2 fastened to a flywheel 6 at an outer circumferential region (not shown in the Figs.) so as to be fixed with respect to rotation relative to it. The housing 2 and flywheel 6 are mounted so as to be rotatable about an axis of rotation D in the installed state. A pressure plate 4 rotatably arranged in the housing 2 is connected by tangential leaf springs (not shown) with the housing 2 so as to be fixed with respect to rotation relative to the housing 2 and axially displaceable relative to the housing 2. A friction face 8 is arranged on a side of the pressure plate 4 facing the flywheel 6, wherein a clutch disk which is not shown and which acts as a driven part is clamped between the friction face 8 and the flywheel 6 when the clutch is engaged. The thrust plate assembly further comprises a diaphragm spring 10 having a radial inside area supported at the housing 2 and a radial outside area supported at the pressure plate 4 via an adjusting mechanism 12.

The adjusting mechanism 12 has a first adjusting ring 26 facing the pressure plate 4 and a second adjusting ring 28 facing the diaphragm spring 10 and one or more spring elements 30 connected between the fist and second adjusting rings 26 and 28 acting essentially in the circumferential direction. The first and second adjusting rings 26 and 28 contact one another via inclined surfaces so that relative rotation results in an axial lengthening of the adjusting mechanism 12. One end of a spring element 30 engages the first adjusting ring 26 and another end engages the second adjusting ring 28, so that the relative rotation of the first and second adjusting rings may be effected as a result of the spring force.

The thrust plate assembly further comprises a play sensor 14 including a wear detection portion 15 and an actuation portion 16 fixedly connected with the wear detection portion 15. In the embodiment shown, the actuation portion 16 is directed radially inward with a radial inner end in a recess 25 of the second adjusting ring 28. The recess 25 is arranged so that the actuation portion 16 is not acted upon by the diaphragm spring 10. The other end of the actuation portion 16 is directed radially outward and is fastened to the wear detection portion 15 of the play sensor 14. The wear detection portion 15 extends through an axial through-opening 5 in the pressure plate 4 and a drive plate side end area 17 of the wear detection portion 15 abuts the flywheel 6 under the urgency of a spring element 20 when the clutch is engaged. When the clutch is released—when the pressure plate 4 is displaced in the direction of the diaphragm spring—the wear detection portion 15 maintains its position in the through-opening 5 due to a friction clamp of the wear detection portion 15 in the through-opening 5. Another spring element 22 acting on the actuation portion 16 generates a tilting moment of the wear detection portion 15 to increase its friction clamp in the through-opening 5. Due to the fact that, during operation, a radial force acts outwardly on the play sensor 14 through the rotation of the clutch, the arrangement shown herein with the radial inner spring element 22 generates an extensively secure friction clamping fit when the clutch is stationary as well as when the clutch rotates.

When the force of the spring element 20 is sufficiently selected, contact between the wear detection portion 15 of the play sensor 14 and the disk flywheel 6 is ensured when the clutch is engaged. In addition, the end of the actuation portion 16 is located in the recess 25 of the second adjusting ring 28 and the diaphragm spring 10 acts on the first and second adjusting rings 26 and 28 during clutch engagement so that the first and second adjusting rings 26 and 28 do not rotate relative to one another. In the event that the adjusting rings 26 and 28 do not fill up the axial intermediate space between an adjusting ring seat 29 on the pressure plate 4 and the end of the actuation portion 16, these adjusting rings 26 and 28 rotate relative to one another automatically through the spring force of the spring elements 30 as soon as the clutch is released. In so doing, the adjusting mechanism 14 is lengthened until it fills up the above-mentioned intermediate space axially.

In contrast to prior art thrust plates, the second adjusting ring 28 in the present thrust plate assembly is secured by an independent device for securing against rotation 24. For this purpose, the embodiment of the thrust plate assembly shown in FIGS. 1, 2a, and 2b includes a sheet-metal clip 40 connected to the pressure plate 4 via an axially extending guide 42 so that it is fixed with respect to rotation relative to the pressure plate 4. The sheet-metal clip 40 also engages a front recess in the second adjusting ring 28 so that it is also fixed with respect to rotation relative to the second adjusting ring 28. The sheet metal clip 40 is secured by the diaphragm spring 10. The above-described relative rotation of the adjusting rings 26 and 28 to fill up the axial intermediate space between the adjusting ring seat 29 on the pressure plate 4 and the end of the actuation portion 16 is therefore effected exclusively through rotation of the first adjusting ring 26 about rotational axis D relative to the pressure plate 4. The adjusting ring 28 on the diaphragm spring side carries out a pure translatory movement in the axial direction of the rotational axis D with respect to the pressure plate 4. Accordingly, the adjusting mechanism does not transmit any torque via the walls of the recess 25 or in some other way to the play sensor 14. The clamping fit of the play sensor 14 in the through-opening 5 is therefore secured, so that the operating reliability of the entire automatic wear adjustment is thereby improved.

FIG. 3 shows a sectional view showing the first and second adjusting rings 26 and 28 from a radial outside of the thrust plate assembly. The end of the actuating portion 16 grabs the recess 25 of the second adjusting ring 28. Also shown is the spring element 30 hooked into a recess in the first adjusting ring 26. The spring elements 30 are each hung with one end onto the first adjusting ring 26 and the other end onto the second adjusting ring 28. In addition, because of the angled or inclined surfaces with which the first and second adjusting rings 26 and 28 rest against each other, the axial distancing of the first and second adjusting rings 26 and 28 changes as they rotate against each other.

Further preferred embodiments are shown in FIGS. 4–7, wherein the housing 2, spring element or diaphragm spring 10 and flywheel 6 are omitted for the sake of clarity. Apart from the described device for securing against rotation 24, the construction and function of the thrust plate assembly of the following embodiments is identical to that described above.

Figure 4:
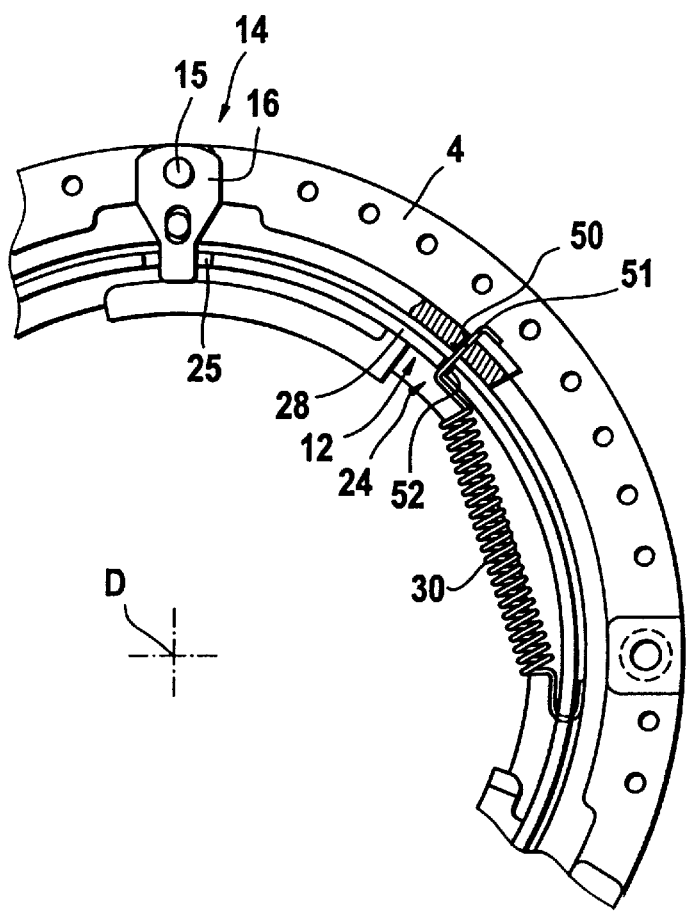
FIG. 4 is a partial sectional top view of a part of another embodiment of the thrust plate assembly in which the end of a spring extends through the adjusting ring on the diaphragm spring side and engages in an opening in the pressure plate.

FIG. 4 shows an embodiment form of the device for securing against rotation 24 in which an end 51 of the spring element 30 extends through an opening 52 of the second adjusting ring 28 and into engagement with a radial opening 50 in the pressure plate 4 so as to be fixed with respect to rotation relative to it. The openings 50 and 52, respectively, in the pressure plate 4 and in the second adjusting ring 28, have an appropriate cross-section for allowing a slight axial movability in spite of the fixed connection with the pressure plate 4 with respect to rotation. This axial movability, which is important for the adjusting function, can be realized, for example, by openings which are elongated in the axial direction. In addition, the naturally occurring elasticity of the spring end 51 may also be utilized in this case.

Figure 5:
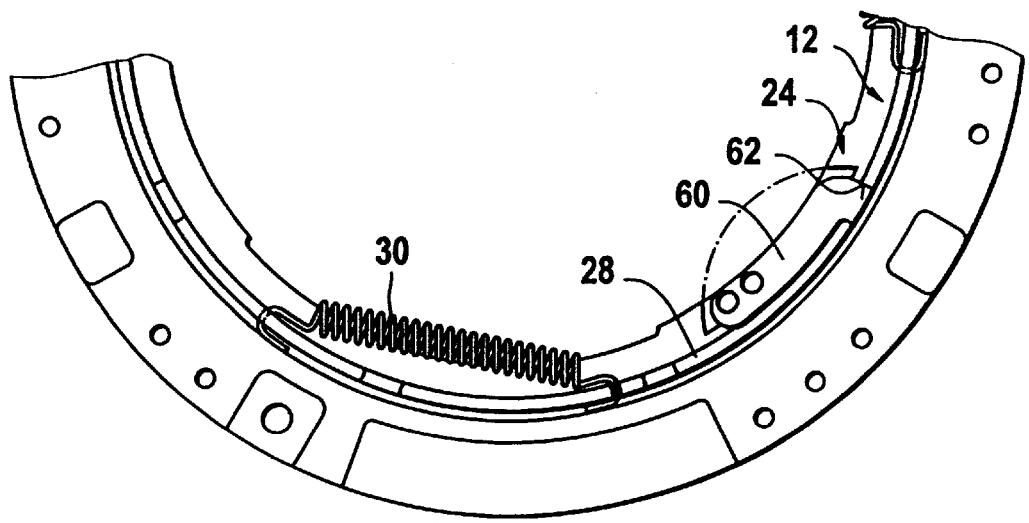
FIG. 5 is a partial sectional top view of a portion of another embodiment of the thrust plate assembly in which a leaf spring fastened to the pressure plate engages in a recess of the adjusting ring on the diaphragm spring side.

In the embodiment of the device for securing against rotation 24 shown in FIG. 5, a leaf spring 60 is fastened to the pressure plate 4 and engages in recess 62 of the second adjusting ring 28.

Figure 6:
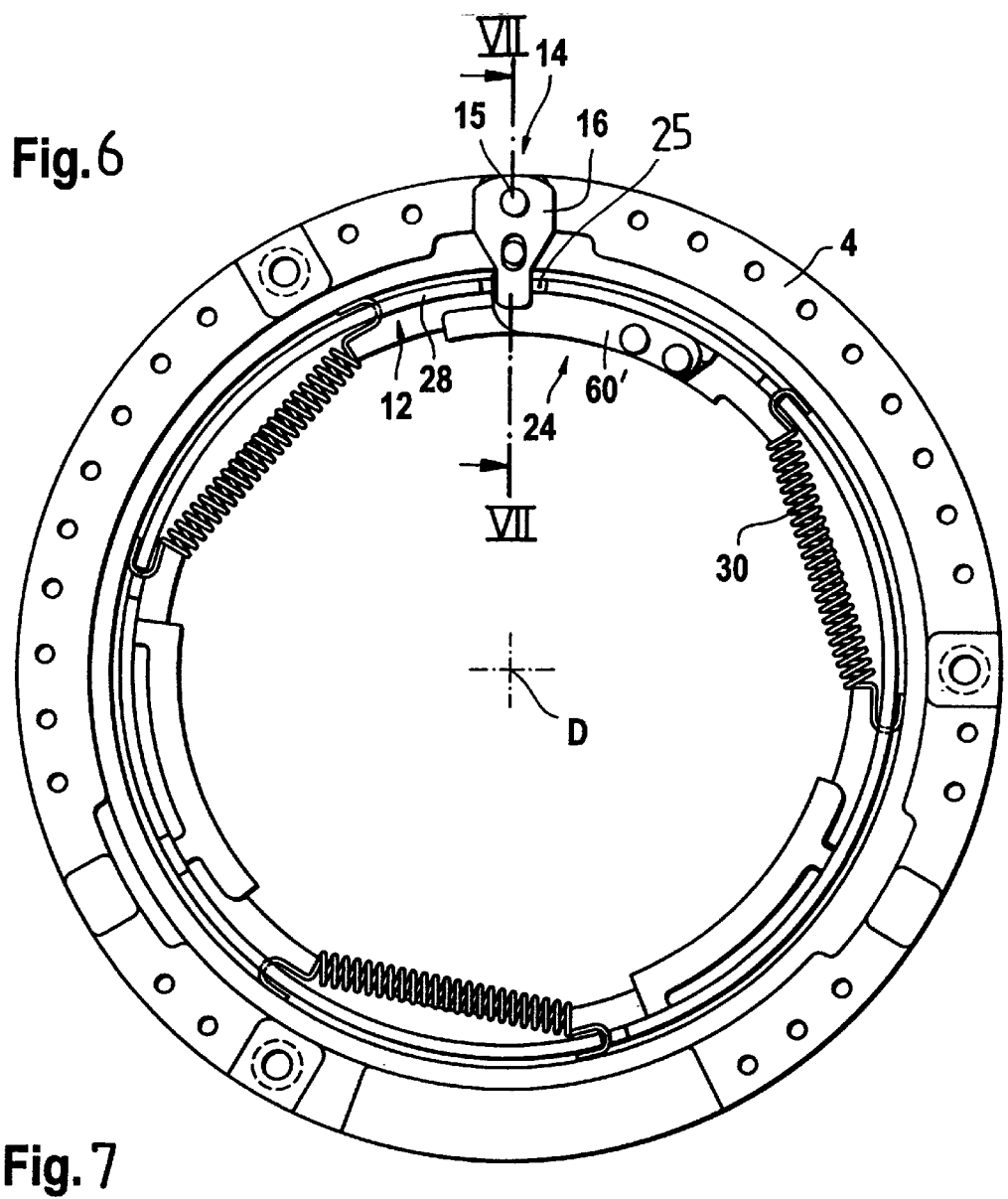
FIG. 6 shows a top view of a portion of yet another embodiment of the thrust plate assembly in which the leaf spring shown in FIG. 5 additionally decouples the play sensor.
Figure 7:
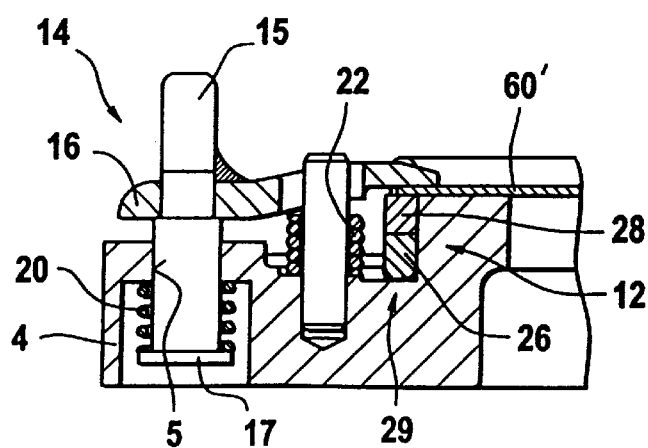
FIG. 7 is a longitudinal sectional view of the thrust plate assembly along line VII—VII in FIG. 6.

FIGS. 6 and 7 show another embodiment form of the thrust plate assembly in which a leaf spring arrangement 60' for securing against rotation similar to the leaf spring arrangement 60 shown in FIG. 4 is arranged between the actuation portion 16 of the play sensor 14 and the second adjusting ring 28. Friction between the actuation portion 16 and the adjusting ring 28 is eliminated. More specifically, the fit of the play sensor 14 is not loosened when the adjusting ring rotates tangentially. Further, the play sensor 14 is decoupled from vibrations of the adjusting mechanism 12 by the leaf spring arrangement 60' in that the leaf spring arrangement 60' urges the second adjusting ring 28 in the recess 25 toward the flywheel 6 to reduce additional axial force on the part of the adjusting mechanism 24 acting on the play sensor 14. Further, the production of the thrust plate assembly is simplified in this embodiment form because the same recess 25 may be used for the leaf spring arrangement 60' and the play sensor 14.

While the preceding description addresses thrust plate assemblies with only one play sensor 14, a plurality of such play sensors and a plurality of devices 24 for securing against rotation may, of course, also be provided.

Also, the play sensor 14 and its wear detection portion 15 need not necessarily abut against the flywheel 6 as in the embodiment forms described above. The expected wear is most severe at the friction faces of the clutch disk and driven part, so that the pressure plate 4 will move gradually toward the flywheel 6 as operating time increases. In order to detect the wear with the wear detection portion 15 in the axial bore hole 5 in the pressure plate 4, it is only necessary to determine the position of the wear detection portion 15 with respect to the flywheel 6 and housing 2 in the engaged state of the clutch. Therefore, the wear detection portion 15 may also abut externally at the housing 2 or at another structural component part connected with the housing 2.

Further, it is noted here that the suggested devices for securing against rotation are in no way limited to the thrust plate assemblies shown herein. In this connection, reference is had, for example, to DE-OS 196 49 135 A1 by the present Applicant which proposes a motor vehicle friction clutch having automatic wear compensation in which a spring part exerts a force on the wear detection portion of the play sensor substantially vertical to the axis of rotation D. Differences with respect to the thrust plate assemblies shown herein do not relate to the proposed means for securing against rotation, and the latter can also be used in connection therewith.

In contrast to the embodiment forms described above, adjusting mechanisms with more than two adjusting rings are also possible.

The invention is not limited by the embodiments described above which are presented as examples only but can be modified in various ways within the scope of protection defined by the appended patent claims.

We claim:

1. A thrust plate assembly for a motor vehicle friction clutch with automatic wear compensation, comprising:

a flywheel rotatably mounted for rotation about an axis of rotation;

a housing fastened to said flywheel for rotation with said flywheel about said axis of rotation;

a pressure plate connected to said housing so that said pressure plate is rotatable fixed to said housing and axially movable with respect to said housing, and said pressure plate having a friction face on a side of said pressure plate facing said flywheel;

a diaphragm spring arranged between said housing and said pressure plate for urging said pressure plate toward said flywheel;

an axially acting adjusting mechanism comprising a first adjusting ring facing said pressure plate and a second adjusting ring facing said diaphragm spring and arranged between said axially acting spring element and said pressure plate such that said axially acting spring element acts on said pressure plate via said axially acting adjusting mechanism, said axially acting adjusting mechanism having an adjustable axial length for compensating wear of the friction clutch;

a play sensor having a wear detection portion axially displaceably arranged for axial displacement against friction relative to said pressure plate in response to the wear of the friction clutch and an actuator portion connected to said wear detection portion and operatively arranged relative to said adjusting mechanism for allowing an axial lengthening of said axially acting adjusting mechanism in response to the wear; and a device for securing at least a portion of said axially acting adjusting mechanism against rotation, wherein said device for securing against rotation is operatively connected for securing said second adjusting ring against rotation relative to said pressure plate and comprises a sheet-metal clip fastened to said pressure plate so that it is fixed with respect to rotation relative to said pressure plate and engaging a recess in said second adjusting ring.

2. The thrust plate assembly of claim 1, wherein said first and second adjusting rings comprise opposing inclined surfaces which contact one another and effect an axial lengthening of said adjusting mechanism in response to a relative rotation of said first and second adjusting rings.

3. The thrust plate assembly of claim 1, further comprising at least one circumferentially acting spring element operatively connected to at least one of said first and second adjusting rings.

4. The thrust plate assembly of claim 1, further comprising at least one circumferentially acting spring element operatively connected between said first and second adjusting rings.

5. The thrust plate assembly of claim 1, further comprising a spring part operatively arranged for exerting a force on said wear detection portion perpendicular to said axis of rotation via said actuation portion such that said play sensor is axially stopped.

6. A thrust plate assembly for a motor vehicle friction clutch with automatic wear compensation, comprising:

a flywheel rotatably mounted for rotation about an axis of rotation;

a housing fastened to said flywheel for rotation with said flywheel about said axis of rotation;

a pressure plate connected to said housing so that said pressure plate is rotatably fixed to said housing and axially movable with respect to said housing, and said pressure plate having a friction face on a side of said pressure plate facing said flywheel;

a diaphragm spring arranged between said housing and said pressure plate for urging said pressure plate toward said flywheel;

an axially acting adjusting mechanism comprising a first adjusting ring facing said pressure plate and a second adjusting ring facing said diaphragm spring and arranged between said axially acting spring element and said pressure plate such that said axially acting spring element acts on said pressure plate via said axially acting adjusting mechanism, said axially acting adjusting mechanism having an adjustable axial length for compensating wear of the friction clutch;

a play sensor having a wear detection portion axially displaceably arranged for axial displacement against friction relative to said pressure plate in response to the wear of the friction clutch and an actuator portion connected to said wear detection portion and operatively arranged relative to said adjusting mechanism for allowing an axial lengthening of said axially acting adjusting mechanism in response to the wear;

a device for securing at least a portion of said axially acting adjusting mechanism against rotation, wherein said device for securing against rotation is operatively connected for securing at least one of said first and second operating rings against rotation relative to said pressure plate and comprises a connection between said at least one of said first and second adjsuting rings and said pressure plate so that said device for securing against rotation and said at least one of said first and second adjusting rings are fixed with respect to rotation relative to said pressure plate; and further comprising a circumferentially acting spring element operatively connected between said first and second adjusting rings, wherein said device for securing against rotation comprises at least one end of said circumferentially acting spring element which engages both said second adjusting ring and a recess of said pressure plate for securing said second adjusting ring against rotation relative to said pressure plate.

7. The thrust plate assembly of claim 6, wherein said device for securing against rotation secures said second adjusting ring against rotation relative to said housing, said flywheel, and said pressure plate.

8. The thrust plate assembly of claim 6, wherein said first and second adjusting rings comprise opposing inclined surfaces which contact one another and effect an axial lengthening of said adjusting mechanism in response to a relative rotation of said first and second adjusting rings.

9. The thrust plate assembly of claim 6, further comprising at least one circumferentially acting spring element operatively connected to at least one of said first and second adjusting rings.

10. The thrust plate assembly of claim 6, further comprising at least one circumferentially acting spring element operatively connected between said first and second adjusting rings.

11. The thrust plate assembly of claim 6, further comprising a spring part operatively arranged for exerting a force on said wear detection portion perpendicular to said axis of rotation via said actuation portion such that said play sensor is axially stopped.

12. A thrust plate assembly for a motor vehicle friction clutch with automatic wear compensation, comprising:

a flywheel rotatable mounted for rotation about an axis of rotation;

a housing fastened to said flywheel for rotation with said flywheel about said axis of rotation;

a pressure plate connected to said housing so that said pressure plate is rotatable fixed to said housing and axially movable with respect to said housing, and said pressure plate having a friction face on a side of said pressure plate facing said flywheel;

a diaphragm spring arranged between said housing and said pressure plate for urging said pressure plate toward said flywheel;

an axially acting adjusting mechanism comprising a first adjusting ring facing said pressure plate and a second adjusting ring facing said diaphragm spring and arranged between said axially acting spring element and said pressure plate such that said axially acting spring element acts on said pressure plate via said axially acting adjusting mechanism, said axially acting adjusting mechanism having an adjustable axial length for compensating wear of the friction clutch;

a play sensor having a wear detection portion axially displaceably arranged for axial displacement against friction relative to said pressure plate in response to the wear of the friction clutch and an actuator portion connected to said wear detection portion and operatively arranged relative to said adjusting mechanism for allowing an axial lengthening of said axially acting adjusting mechanism in response to the wear; and a device for securing at least a portion of said axially acting adjusting mechanism against rotation, wherein said device for securing against rotation is operatively connected for securing said second adjusting ring against rotation relative to said pressure plate and comprises a leaf spring fastened to said pressure plate and engaging a recess in said second adjusting ring.

13. The thrust plate assembly of claim 12, wherein said leaf spring axially separates said second adjusting ring from said actuation portion of said play sensor so that said adjusting mechanism is frictionally decoupled from said actuation portion.

14. The thrust plate assembly of claim 12, wherein said first and second adjusting rings comprise opposing inclined surfaces which contact one another and effect an axial lengthening of said adjusting mechanism in response to a relative rotation of said first and second adjusting rings.

15. The thrust plate assembly of claim 12, further comprising at least one circumferentially acting spring element operatively connected to at least one of said first and second adjusting rings.

16. The thrust plate assembly of claim 12, further comprising at least one circumferentially acting spring element operatively connected between said first and second adjusting rings.

17. The thrust plate assembly of claim 12, further comprising a spring part operatively arranged for exerting a force on said wear detection portion perpendicular to said axis of rotation via said actuation portion such that said play sensor is axially stopped.

* * * * *